(12) United States Patent
Suzuki et al.

(10) Patent No.: US 6,874,881 B2
(45) Date of Patent: Apr. 5, 2005

(54) INK, INK CARTRIDGE, RECORDING UNIT, INK JET RECORDING METHOD, INK JET RECORDING APPARATUS AND METHOD FOR STABILIZING INK DISCHARGE

(75) Inventors: Mariko Suzuki, Kanagawa (JP); Shoji Koike, Kanagawa (JP); Makoto Aoki, Kanagawa (JP); Koromo Shirota, Kanagawa (JP); Hideki Takayama, Kanagawa (JP); Yasuhiro Nito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,912

(22) Filed: Aug. 9, 2002

(65) Prior Publication Data

US 2003/0081086 A1 May 1, 2003

(30) Foreign Application Priority Data

| Aug. 22, 2001 | (JP) | 2001-251482 |
| Aug. 22, 2001 | (JP) | 2001-251699 |
| Jul. 19, 2002 | (JP) | 2002-211562 |

(51) Int. Cl.[7] .................................................. B41J 2/01
(52) U.S. Cl. ..................... 347/100; 347/101; 106/31.13
(58) Field of Search .................... 347/100, 95, 96, 347/101; 106/31.13, 31.27, 31.6; 523/160

(56) References Cited

U.S. PATENT DOCUMENTS

| 5,221,334 A | 6/1993 | Ma et al. .................. 106/20 D |
| 5,272,201 A | 12/1993 | Ma et al. ...................... 524/505 |
| 5,519,085 A | 5/1996 | Ma et al. ...................... 524/503 |
| 5,640,187 A | 6/1997 | Kashiwazaki et al. ...... 347/101 |
| 5,696,182 A | 12/1997 | Kashiwazaki et al. ...... 523/161 |
| 5,852,075 A | 12/1998 | Held ........................... 523/161 |
| 5,854,331 A * | 12/1998 | Ma et al. ...................... 524/505 |
| 5,877,235 A * | 3/1999 | Sakuma et al. ........... 106/31.58 |
| 5,952,414 A * | 9/1999 | Noguchi et al. ............. 524/377 |
| 5,997,136 A * | 12/1999 | Fujisawa et al. ............ 347/101 |
| 6,117,921 A | 9/2000 | Ma et al. ...................... 523/161 |
| 6,153,001 A * | 11/2000 | Suzuki et al. ............ 106/31.65 |
| 6,391,947 B1 | 5/2002 | Noguchi et al. ............... 524/84 |
| 2002/0002930 A1 * | 1/2002 | Yamashita et al. .......... 106/31.6 |

FOREIGN PATENT DOCUMENTS

| EP | 0 586 101 A1 | 3/1994 |
| EP | 0 712 913 A1 | 5/1996 |
| JP | 5-179183 A | 7/1993 |
| JP | 6-136311 A | 5/1994 |
| JP | 7-53841 A | 2/1995 |
| JP | 10-87768 A | 4/1998 |
| JP | 11-43639 A | 2/1999 |
| JP | 11-236502 A | 8/1999 |
| JP | 11-269418 A | 10/1999 |

OTHER PUBLICATIONS

U.S. Appl. No. 09/884,094, filed Jun. 20, 2001, Kashiwazaki, pending.
U.S. Appl. No. 10/214,584, filed Aug. 9, 2002, Suzuki et al., pending.
U.S. Appl. No. 10/218,423, filed Aug. 15, 2002, Shirota et al., pending.

* cited by examiner

Primary Examiner—Manish Shah
(74) Attorney, Agent, or Firm—Fitzpatrick, Cella, Harper & Scinto

(57) ABSTRACT

Provided is an ink-jet ink suitable for high speed printing and reduced ink ejection amount, wherein ink includes a water-insoluble coloring material dispersed in water with a resinous dispersant, glycerin, ethylene urea, and polyoxyethylene alkyl ether with HLB not lower than 13.

25 Claims, 3 Drawing Sheets

INK, INK CARTRIDGE, RECORDING UNIT, INK JET RECORDING METHOD, INK JET RECORDING APPARATUS AND METHOD FOR STABILIZING INK DISCHARGE

BACKGROUND OF THE INVENTION

1. Field of the Invention

The present invention relates to a pigment ink for ink jet recording systems, especially suitable for the thermal type ink jet recording system, which will provide ink discharge stability and durability to the recording head. The present invention also relates to an ink cartridge, recording unit, an ink jet recording method using them, an ink jet recording apparatus and a method for stabilizing the ink discharge.

2. Related Background Art

The ink jet recording method is a method of recording by applying energy to ink to eject an ink droplet from a nozzle to deposit the ink onto a recording medium such as paper.

Recently the size of an ink droplet discharged from a single nozzle has become smaller and smaller in order to meet the need for an ink jet recorded image of extremely high quality comparable to that of silver halide photography, and now ink jet printers that eject an ink droplet of not larger than about 10 pl (picoliter) are commercially available. Also with increasing demand for higher printing speed, it is necessary to accommodate a higher drive frequency (for example 5 kHz or higher, preferably 10 kHz or higher).

SUMMARY OF THE INVENTION

Recently, not only preciseness but also fastness such as light fastness are required for the ink jet recorded image. Thus, use of water-insoluble coloring materials such as pigments has started. However, the understanding of the application of ink containing a water-insoluble coloring material to a high-speed ink jet recording system to obtain precise images is still insufficient.

Under these circumstances, the present inventors have been studying the possibility of high-speed thermal ink jet recording of highly precise images with ink containing water-insoluble pigment dispersed in an aqueous medium with a resinous dispersant. In the course of such investigation, they found that such an ink may not fail to keep up with increasing drive frequency of the thermal ink jet head, thereby causing unstable ink discharge. As a result of further investigation based on such finding, the present inventors considered that, when such an ink was heated by the heater of the thermal ink jet head, the pigment and the resinous dispersant physically adsorbed to the pigment separated temporarily to lose dispersion stability, which would cause ink discharge instability. In the case of low drive frequencies, even if the dispersion state is disrupted temporarily, the stability of dispersion is restored, for example by re-adsorption of the resinous dispersant to the pigment, but with higher drive frequencies, the restoration of the dispersion stability is insufficient, resulting in instability of the ink discharge. Thus, to meet the aforementioned requirements based on the future technical trend, the present inventors have done an intensive study to obtain an ink for an ink jet printer, particularly for thermal ink jet recording, that can form an image of higher preciseness at a higher recording speed while maintaining the basic properties required for the ink jet recording ink, such as the start-up property (discharge ability of the ink from a nozzle after temporary suspension of discharge) and clogging resistance in the nozzle. As a result, they have found that ink of a particular composition can achieve the aforementioned objects, whereby the present invention was made.

An object of the present invention is to provide an ink jet ink containing a water-insoluble coloring material dispersed in water with a resinous dispersant that can cope with further increase in the recording speed and further decrease in the droplet size.

Another object of the present invention is to provide an ink jet recording method capable of forming a high quality image at a high speed and in a stable manner.

Still another object of the present invention is to provide an ink cartridge, a recording unit and an ink jet recording apparatus applicable to the above-mentioned ink jet recording method.

Still another object of the present invention is to provide a method for stabilizing ink discharge from a thermal ink jet recording head when the liquid droplet size is reduced and/or the drive frequency is increased.

According to an embodiment of the present invention, there is provided an ink jet ink comprising water, a water-insoluble coloring material, a resinous dispersant for dispersing said water-insoluble coloring material into water, glycerin, ethylene urea, and polyoxyethylene alkyl ether having HLB of 13 or more.

According to another embodiment of the present invention, there is provided an ink cartridge comprising an ink container which contains the aforementioned ink.

According to another embodiment of the present invention, there is provided a recording unit comprising an ink container which contains the aforementioned ink, and an ink jet head for discharging the ink.

According to another aspect of the present invention, there is provided an ink jet recording method comprising a step of discharging the aforementioned ink from an ink jet recording head.

According to another embodiment of the present invention, there is provided an ink jet recording apparatus comprising an ink container which contains the aforementioned ink, and an ink jet recording head for discharging the ink.

According to still another embodiment of the present invention, there is provided a method for stabilizing ink discharge from an ink jet recording head when the ink jet recording head is driven at a frequency of not less than 5 kHz, the ink jet recording head's ink discharge amount per discharge operation being not more than 20 pl, comprising the step of discharging the aforementioned ink from the ink jet recording head.

The reason why such a configuration can stabilize ink discharge in thermal ink jet recording even at high drive frequencies is not yet clarified, but it is presumed that polyoxyethylene alkyl ether of HLB not lower than 13, glycerin and ethylene urea function synergistically to rapidly restore the dispersion state of the ink temporarily disturbed on the heater surface.

DETAILED DESCRIPTION OF THE PREFERRED EMBODIMENTS

Figure 1:
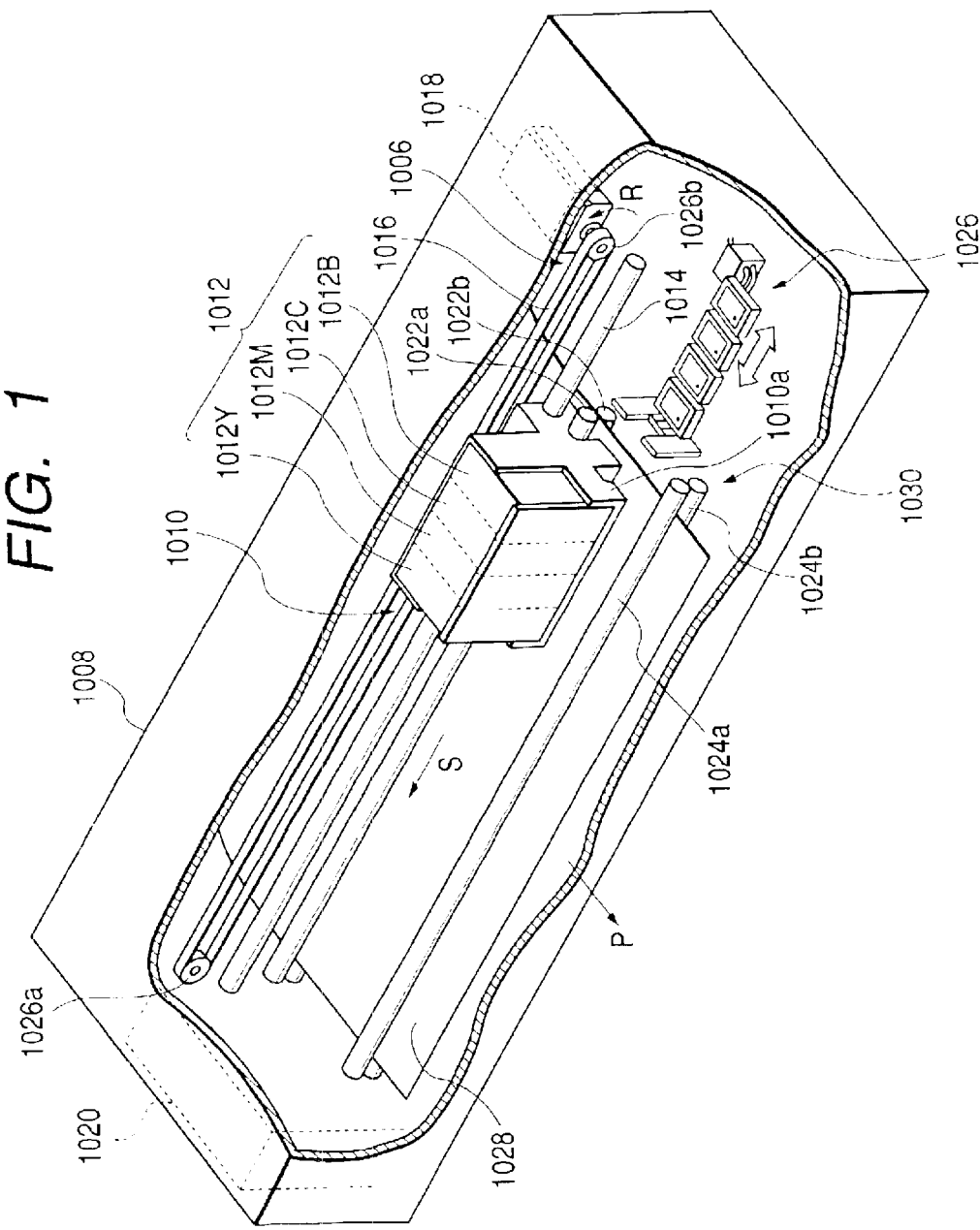
FIG. 1 is a schematic perspective view showing the principal part of an ink jet printer capable of being equipped with a liquid discharge head.

Now the present invention is described in detail by referring to preferred embodiments thereof.

As described above, an ink jet ink in an embodiment of the present invention has a feature that it comprises:
(i) water;
(ii) a water-insoluble coloring material;
(iii) a resinous dispersant for dispersing the water-insoluble coloring material in water;
(iv) glycerin;
(v) ethylene urea; and
(vi) polyoxyethylene alkyl ether having HLB not lower than 13.

[Liquid Components]

(i) Water

The ink of the present invention is a so-called aqueous ink jet ink, and the water content in the total weight of the ink is at least 50% or higher, preferably 60% or higher.

(ii) Water-insoluble Coloring Material

The water-insoluble coloring material to be employed in the present invention can be, for example, an organic pigment or an inorganic pigment.

As the pigment for black ink, for example, carbon black can be used advantageously. Examples of carbon black include furnace black, lamp black, acetylene black and channel black. Within such carbon black, particularly preferred is one having a primary particle size within a range of 15 to 40 nm, a specific surface area measured by the BET method within a range of 50 to 300 $m^2/g$, a DBP oil absorption amount within a range of 40 to 150 ml/100 g, and a volatile content of 0.5 to 10%.

As the pigment to be employed in color inks, organic pigments can be advantageously employed. Examples of such organic pigments include insoluble azo pigments such as toluidine red, toluidine maroon, hanza yellow, benzidine yellow or pyrazolone red; soluble azo pigments such as lithol red, helio bordeaux, pigment scarlet or permanent red B; vat dye derivatives such as alizarin, indanthrone or thioindigo maroon; phthalocyanine pigments such as phthalocyanine blue or phthalocyanine green; quinachridone pigments such as quinachridone red or quinachridone magenta; perylene pigments such as perylene red or perylene scarlet; isoindolinone pigments such as isoindolinone yellow or isoindolinone orange; imidazolone pigments such as benzimidazolone yellow, benzimidazolone orange or benzimidazolone red; pyranthrone pigments such as pyranthrone red or pyranthrone orange; thioindigo pigments; condensed azo pigments; diketo-pyrolopyrrole pigments; flavanthrone yellow; acylamide yellow; quinophthalone yellow; nickel azo yellow; copper azomethyne yellow, perynone orange; anthrone orange; dianthraquinonyl red; and dioxadine violet.

Also the example of the organic pigments, represented by the color index (C.I.) numbers, include C.I. pigment yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, 185; C.I. pigment orange 16, 36, 43, 51, 55, 59, 61, 71; C.I. pigment red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272; C.I. pigment violet 19, 23, 29, 30, 37, 40, 50; and C.I. pigment blue 15:1, 15:3, 15:4, 15:6, 22, 60, 64; C.I. pigment green 7, 36; C.I. pigment brown 23, 25, 26. Other pigments can also be used, but particularly preferred are C.I. pigment yellow 13, 17, 55, 74, 93, 97, 98, 110, 128, 139, 147, 150, 151, 154, 155, 180, 185; C.I. pigment red 122, 202, 209; and C.I. pigment blue 15:3, 15:4.

In the ink of the present invention, the amount of the water-insoluble coloring material relative to the entire weight of the ink may vary according to the intended coloring ability of the ink and the intended color hue to be reproduced on the recording medium, and also the quality of the ink jet image to be formed. Thus, it is not particularly limited as long as the practical physical properties as an ink jet ink can be maintained. In general, the upper limit is about 10% of the total weight of the ink. The present invention is also applicable to so-called pale ink containing a coloring material at a concentration of about 0.1 to 0.5% in the ink. Such pale ink has low coloring ability and often is employed for forming an ink jet image of silver-halide photographic quality. The present invention is, however, more effective with ink containing a coloring material at a high concentration, since the aforementioned disturbance of dispersion stability of the coloring material in the ink, which occurs in the vicinity of the heater during the thermal ink jet recording, tends to occur as the coloring material concentration increases.

(iii) Resinous Dispersant

Any water-soluble resin known as a dispersant can be used as the resinous dispersant as long as it is comprised of a hydrophobic portion having an affinity to the water-insoluble coloring material and a hydrophilic portion having an affinity to water. Examples of such resinous dispersant include block copolymers, random copolymers, graft copolymers and salts thereof made with two or more kinds of monomers (at least one is a hydrophilic monomer) selected from styrene, styrene derivatives, vinylnaphthalene, and derivatives thereof, aliphatic alcohol esters of $\alpha$, $\beta$-ethylenic unsaturated carboxylic acids, acrylic acid and derivatives thereof, maleic acid and derivatives thereof, itaconic acid and derivatives thereof, fumaric acid and derivatives thereof, vinyl acetate, vinylpyrrolidone, acryl amide and derivatives thereof. Among these, block copolymer is particularly preferred for the present invention.

Needless to say, it is preferable that ink discharge is not at all or hardly affected by the resinous dispersant present in the ink in an amount required for dispersing the water-insoluble coloring material or more, in view of stabilization of ink discharge under high frequency drive, which is one of the objectives of the present invention. Among the aforementioned resinous dispersants, a substance having a block structure, namely a block copolymer, is particularly preferred for such an objective.

The block copolymer can be represented by, for example, AB, BAB, ABC etc., where A, B and C represent polymer blocks of different structures respectively. Block copolymers comprised of a hydrophobic block and a hydrophilic block of which block size is well balanced in contributing to the dispersion stability are particularly useful for the present invention. Also, the hydrophobic block to which the coloring material binds may contain a functional group to enhance the specific interaction between the dispersant and the coloring material, thereby further improving the dispersion stability. Due to its rheological properties, such a polymer is especially preferably used in an ink jet recording head utilizing thermal energy, particularly, in an ink jet recording head ejecting minute ink droplets, more specifically, in an amount of 20 pl or less, more specifically within a range of 0.1 to 20 pl, particularly 0.1 to 15 pl and more particularly 0.1 to 10 pl per one ejection operation. The amount of the polymer in the ink is variable depending on the structure, molecular weight and other properties of such polymer and other components of the ink composition. The weight-average molecular weight of the polymer selected in exercising the present invention is less than 30,000, preferably less than 20,000 and more preferably within a range of 2,000 to 10,000.

Methods for producing such polymers are disclosed in the Japanese Patent Applications Laid-open Nos. 05-179183, 06-136311, 07-053841, 10-87768, 11-043639, 11-236502 and 11-269418.

Representative examples of the hydrophobic monomer employable in the block copolymer include, but are not limited to, benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethyl-siloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxyethyl acrylate, glycidyl acrylate, p-tolyl acrylate and sorbyl acrylate. The preferred hydrophobic monomer is benzyl acrylate, benzyl methacrylate, 2-phenylethyl methacrylate, methyl methacrylate, butyl methacrylate or 2-ethylhexyl methacrylate, of which homopolymer or copolymer such as copolymer of methyl methacrylate and butyl methacrylate can be used for block copolymer.

Representative examples of the hydrophilic monomer employable in the block copolymer include, but are not limited to, methacrylic acid (MAA), acrylic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylamino-propyl methacrylamide, methacrylamide, acrylamide and dimethyl-acrylamide. It is preferable to produce a block copolymer utilizing homopolymer or copolymer of methacrylic acid, acrylic acid or dimethylaminoethyl methacrylate.

Acid-containing polymer can be produced either directly or from a monomer blocked by a blocking group that is removed after the polymerization. Examples of a blocked monomer to generate acrylic acid or methacrylic acid after deblocking include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate and 2-tetrahydropyranyl methacrylate.

When the head utilizing thermal energy is driven at a high frequency, for example, at 5 kHz or higher and in particular 10 kHz or higher, use of such a block copolymer is very effective in improving the discharge properties.

The content of the resinous dispersant in the ink is within a range of 0.5 to 10 weight %, preferably 0.8 to 8 weight % and more preferably 1 to 6 weight %. Within such range, the viscosity of the ink can be easily maintained in a range practical for the ink jet ink.

(iv, v) Glycerin and Ethylene Urea

Glycerin and ethylene urea are critically important components in maintaining high level ink jet properties of the present invention such as start-up property and anti-solidification resistance. Such ink jet properties are significantly affected by the following three factors:

(1) water-holding ability of ink when it is left standing;
(2) flowability of ink when water is evaporated to a certain extent from the ink; and
(3) re-solubility of solidified substance when water has evaporated from the ink.

Studying various solvents, the present inventors have found that a combination of glycerin and ethylene urea gives excellent solidification resistance to the ink containing the aforementioned components (ii) (pigment) and (iii) (dispersant), particularly when the ink is used with a head for minute droplet discharging.

At the same time, single use of these substances was studied. First, if glycerin was added to a level sufficient for providing solidification resistance, the ink viscosity became too high to achieve sufficient start-up property, since high viscosity is unfavorable for this property. Also it was found that high glycerin content sometimes caused breakage of the thermal ink jet heater in a prolonged printing durability test.

Next, single use of ethylene urea was studied to find that sufficient solidification resistance was not always obtained as required in the present invention. In addition, ethylene urea in an excessive amount would result in kogation more frequently in the prolonged printing durability test. This kogation phenomenon is presumably attributed to inhibition of the interaction of the pigment and the resinous dispersant by excessive ethylene urea.

Based on the investigation result, the inventors have found a suitable range of glycerin and ethylene urea, which can provide satisfactory solidification resistance without excessively increasing the ink viscosity. In such a range, the start-up property is much improved in comparison with single use of one of these substances.

This is presumably because presence of ethylene urea having a film forming ability at a gas-liquid interface and glycerin allows formation of a film at the tip of the nozzle, a film of such a delicate strength that suppresses water evaporation but can be broken by the discharge energy.

The content of glycerin is preferably within a range of 3 to 15 weight %, more preferably 3.5 to 12 weight % and most preferably 4 to 10 weight % in view of maintenance of satisfactory ink jet properties in cooperation with ethylene urea.

Similarly the content of ethylene urea is preferably within a range of 3 to 15 weight %, more preferably 4 to 12 weight %, and most preferably 5 to 10 weight %.

In the present invention, it is found that an even more noticeable effect can be obtained from the aforementioned factors if the mixing ratio by weight of glycerin (A) and ethylene urea (B) is within a range of A:B=5:1 to 1:5, preferably 3:1 to 1:4 and more preferably 1.5:1 to 1:3.

It was also found that the combination of glycerin and ethylene urea provides satisfactory storability for the pigment ink utilizing resinous dispersant, in addition to the satisfactory start-up property and solidification resistance.

With conventional ink employing a resinous dispersant, the resinous dispersant tends to separate from the pigment during prolonged storage to dissolve into the aqueous medium, causing increase in the particle size of the pigment or ink viscosity due to the coagulation of the pigment particles of which dispersion state was disrupted.

Such a phenomenon occurs not only at a high temperature but also at a low temperature, differing from the storability of dye ink.

Again, it was found that the combined use of glycerin and ethylene urea can suppress the increase in the pigment particle size or ink viscosity during storage not only at high temperatures (for example 30 to 70° C.) but also at low temperatures (for example at 0 to 10° C.).

This is presumably because the interaction of glycerin, ethylene urea and the resinous dispersant surrounding the pigment reduces the tendency of the resinous dispersant to be separated from the pigment and dissolved into the aqueous medium.

(vi) Polyoxyethylene Alkyl Ether

As explained above, the combined use of glycerin and ethylene urea provides ink that is satisfactory in start-up property, solidification resistance and ink storability.

Polyoxyethylene alkyl ether having an HLB not lower than 13 is the component that provides the ink containing the components (i) to (v) with adaptability for high-speed thermal ink jet recording, without spoiling the preferred ink jet properties due to the components (iv) and (v).

When the head heater of the thermal ink jet head was observed by a microscope after the discharge operation, the disrupted dispersion that will cause kogation on the heater at the bubble forming operation was not observed with addition of polyoxyethylene alkyl ether having HLB not lower than 13. Thus polyoxyethylene alkyl ether is considered to have a function to re-dissolve the product of disrupted dispersion. As already explained, the combination of glycerin and ethylene urea has a strong ability to re-dissolve the agglomerated pigment, and the combination of these solvents and polyoxyethylene alkyl ether having an HLB not lower than 13 is considered to instantaneously re-dissolve the insoluble matters formed on the heater surface due to disrupted dispersion.

Polyoxyethylene alkyl ether mentioned above has a structure represented by the following formula:

wherein R stands for an alkyl group, and n stands for an integer of 10 to 40.

Examples of polyoxyethylene alkyl ether having HLB not lower than 13 and not higher than 20 are not particularly limited. In the foregoing formula, alkyl group (R) in the hydrophobic portion may be of any carbon number as long as surface activity can be obtained. For example, it may be a lauryl, cetyl, stearyl, oleyl or behenyl group, and is preferably an alkyl group with 16 to 18 carbon atoms, more preferably a cetyl group. On the other hand, the number (n) of ethylene oxides in the hydrophilic portion is preferably 10 to 40. The HLB is within a range of 13 to 20, preferably 15 to 20 and more preferably 17 to 20. Its content in the ink is within a range of 0.1 to 3 weight %, preferably 0.2 to 2.5 weight % and more preferably 0.3 to 2 weight %.

In the present invention, a nonionic surfactant may be used in addition to polyoxyethylene alkyl ether. Examples of such a nonionic surfactant include ethylene oxide addition product of acetylene glycol, polyoxyethylene alkylphenylether, polyoxyethylene fatty acid ester, sorbitan fatty acid ester, and polyoxyethylene sorbitan fatty acid ester. In particular, ethylene oxide addition product of acetylene glycol, when applied to the ink of the present invention, provides a particularly excellent effect in stabilizing the discharge speed. The stabilized discharge speed allows an ink jet image that is uniform or has less unevenness to be obtained. Also, a nonionic surfactant having HLB not lower than 10, more preferably not lower than 13, more preferably not lower than 15, can be advantageously employed. The content of such a surfactant used in combination with polyoxyethylene alkyl ether in the ink is within a range of 0.1 to 3 weight %, preferably 0.2 to 2.5 weight %, and more preferably 0.3 to 3 weight %.

(vii) Other Water-soluble Organic Solvents

An optional component may be added to the ink containing the components (i) to (vi) for obtaining other various effects. Examples of such a component (vii) include 2-pyrrolidone, ethylene glycol, glycols with 3 to 6 carbon atoms, and triols with 4 to 6 carbon atoms. One of more of such water-soluble organic solvents may be added according to the properties to be enhanced.

For example, to improve printing endurance, it is preferred to include 2-pyrrolidone or ethylene glycol in the ink. The present inventors consider that 2-pyrrolidone or ethylene glycol re-dissolves the disrupted dispersion product precipitated on the heater during the bubble generating operation, preventing accumulation on the heater to improve printing endurance. The content of 2-pyrrolidone or ethylene glycol in the ink is 0.5 to 10 weight %, preferably 1 to 8 weight %.

To improve solidification resistance or start-up property, it is preferable to include glycol of 3 to 6 carbon atoms or triol of 4 to 6 carbon atoms in the ink. Any glycol with 3 to 6 carbon atoms or any triol with 4 to 6 carbon atoms may be used, but particularly preferred is diethylene glycol, triethylene glycol, or 1,2,6-hexane-triol. These substances, having a low vapor pressure and less tendency to evaporate, are known as an excellent solvent for improving the solidification resistance and the start-up property. However, testing various materials of low vapor pressure for the ink of the present invention, the inventors have found that glycols of 3 to 6 carbon atoms and triols of 4 to 6 carbon atoms are particularly excellent to improve the solidification resistance and the start-up property without spoiling other properties. The content of such glycol of 3 to 6 carbon atoms or triol of 4 to 6 carbon atoms is within a range of 1 to 8 weight %, preferably 2 to 6 weight % of the total weight of the ink.

Water-soluble organic solvents that may be employed in the present invention other than those described above include amides such as dimethylformamide and dimethylacetamide; ketones or ketoalcohols such as acetone and diacetone alcohol; ethers such as tetrahydrofuran and dioxane; oxyethylene or oxypropylene copolymers such as tetraethylene glycol, tripropylene glycol, polyethylene glycol and polypropylene glycol; lower alkylethers such as ethylene glycol monomethyl (or ethyl) ether, diethylene glycol monomethyl (or ethyl) ether and triethylene glycol monomethyl (or ethyl) ether; lower dialkylethers of polyhydric alcohols such as triethylene glycol dimethyl (or ethyl) ether and tetraethylene glycol dimethyl (or ethyl) ether; alkanolamines such as monoethanolamine, diethanolamine and triethanolamine; sulforane, N-methyl-2-pyrrolidone, 1,3-dimethyl-2-imidazolidinone and trimethylol propane.

The total content of the aforementioned water-soluble organic solvents including glycerin and ethylene urea, contained in the pigment ink of the present invention, is not particularly limited, but preferably within a range of 3 to 50 weight %, more preferably 10 to 35 weight % of the total weight of the ink. Also the water content of the pigment ink is preferably within a range of 50 to 95 weight % of the total weight of the ink.

Also the pigment ink of the present invention, in order to obtain desired physical properties, may further contain other additives such as a viscosity adjusting agent, an antifoaming agent, an antiseptic, an antimold agent, or an antioxidant. The surfactant is preferably selected in such a manner that the surface tension of the ink is not lower than 25 mN/m, preferably not lower than 30 mN/m.

<Ink Jet Recording Apparatus>

In FIG. 1, the ink jet printer is configured to comprise a feeder device 1030 that intermittently feeds a sheet of paper 1028 as a recording medium provided along the longitudinal direction in a casing 1008 in the direction shown by arrow P shown in FIG. 1, a recording section 1010 that is reciprocated approximately in parallel to the direction S approximately at right angles to the feeding direction P of the paper 1028 by the feeder device 1030, and a movement driving section 1006 as driving means for reciprocating the recording section 1010.

The feeder device 1030 comprises roller units 1022a and 1022b and roller units 1024a and 1024b, which are located approximately in parallel, and a driving portion 1020 for driving these roller units. With such a constitution, when the driving portion 1020 of the feeder device 1030 is operated, the paper 1028 is conveyed intermittently in the direction P, nipped between the roller units 1022a and 1022b, and 1024a and 1024b.

The movement driving section 1006 is configured to comprise a belt 1016 that is wound on pulleys 1026a, 1026b provided on rotary shafts oppositely arranged with a predetermined interval, and a motor 1018 that drives the belt 1016 arranged approximately in parallel to roller units 1022a, 1022b and connected to a carriage member 1010a of the recording section 1010 in the forward direction and reverse direction.

When the motor 1018 is brought in the operating state and the belt 1016 is rotated in the direction shown by arrow R, the carriage member 1010a of the recording section 1010 is moved in the direction shown by arrow S only by a predetermined movement. Furthermore, when the motor 1018 is brought in the operating state and the belt 1016 is rotated in the direction opposite to the direction shown by arrow R, the carriage member 1010a of the recording section 1010 is moved in the direction opposite to the direction shown by arrow S only by a predetermined movement. Furthermore, to one end of the movement driving section 1006, at a position which is a home position of the carriage member 1010a, a recovery unit 1026 for performing the ejection recovery process of the recording section 1010 is provided opposite to the arrangement of the ink ejection orifice of the recording section 1010.

In the recording section 1010, ink jet cartridges (hereafter, in some cases, referred to simply as cartridges) 1012Y, 1012M, 1012C, and 1012 B are detachably provided to the carriage member 1010a for each color, for example, for each of yellow, magenta, cyan, and black.

The effect of the ink composition of the present invention is not limited to a particular color, and, in a preferred embodiment, at least two selected from the aforementioned yellow, magenta, cyan and black inks have the ink composition of the present invention. Also in another preferred embodiment of the present invention, two different inks that provide the same color hue image but having different coloring abilities, namely so-called dense and pale inks, have the ink composition of the present invention. Here, the same color hue image means that when images of 360 dpi (dot per inch)×720 dpi on plain paper are formed with the dense ink and the pale ink respectively using an ink jet recording head that ejects 20 to 50 pl droplets, and thus obtained images are visually observed and are classified into 10 Munsell categories (R, YR, Y, GY, G, BG, B, PB, P and RP) based on the Munsell color chart, and the images belong to the same category or adjacent categories. Also a higher coloring ability means that the ink contains the coloring material at a relatively higher content.

Figure 3:
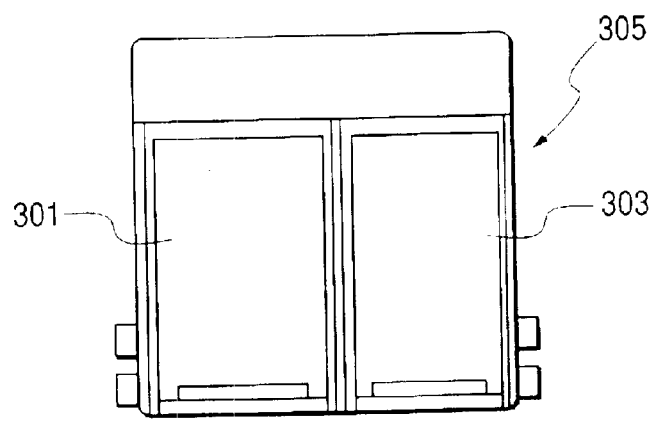
FIG. 3 is a schematic view showing an embodiment of the ink cartridge of the present invention.
Figure 4:
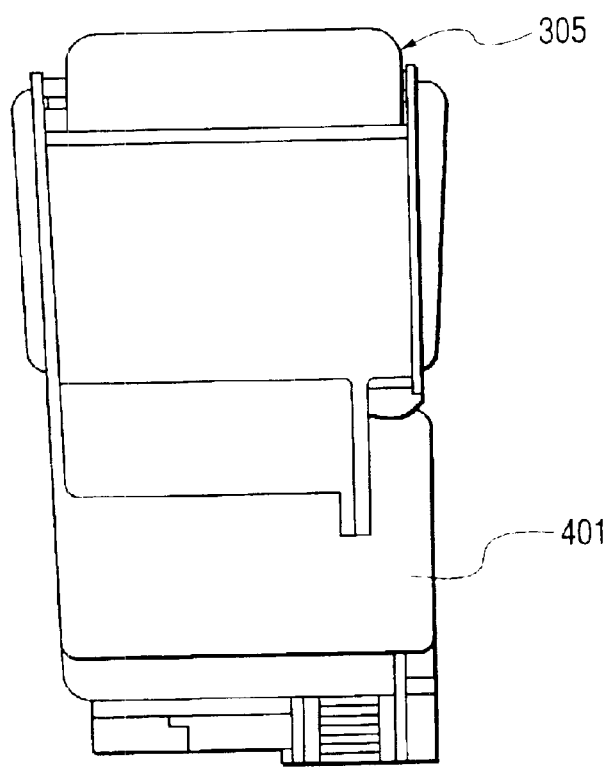
FIG. 4 is a schematic view showing an embodiment of the recording unit of the present invention.

In the above-described configuration, the ink set of the present invention having different colors or the set of dense and pale inks may be contained in different cartridges as illustrated in FIG. 1. Alternatively, inks may be contained in an ink cartridge 305 having ink-containers 301 and 303 as shown in FIG. 3, and the cartridge is detachably mounted on an ink jet recording head 401 as shown in FIG. 4. When the ink cartridge shown in FIG. 3 is mounted on the ink jet recording head 401 as shown in FIG. 4, each of the inks of the present invention and other inks are fed to the recording head and are discharged therefrom. FIGS. 3 and 4 illustrate a configuration in which the ink cartridge is detachably mounted on the ink jet recording head, but it is also possible to have a configuration in which the ink cartridge and the ink jet recording head are integrally constructed.

Figure 2:
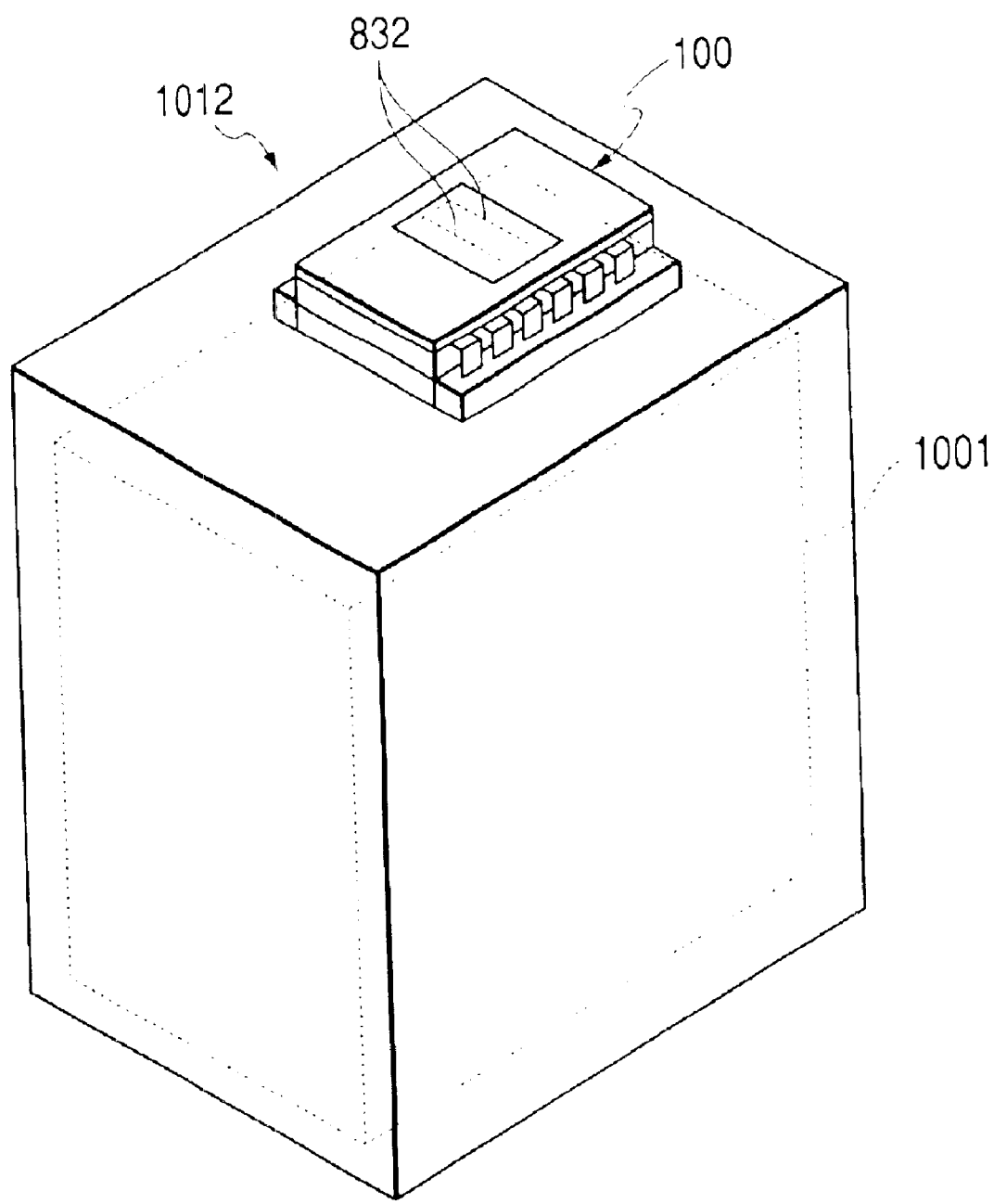
FIG. 2 is a schematic perspective view showing an ink jet cartridge equipped with a liquid discharge head.

FIG. 2 shows an example of the ink jet cartridge mountable on the above-described ink jet recording apparatus. The cartridge 1012 in the present embodiment is of a serial type, of which main part is comprised of an ink jet recording head 100 and a liquid tank 1001 for containing a liquid such as ink.

The ink jet recording head 100 is provided with a plurality of discharge ports 832 for discharging a liquid, and such a liquid, or ink, is introduced from the liquid tank 1001 to a common liquid chamber (not shown) of the liquid discharge head 100 through a liquid supply path (not shown). The cartridge 1012 shown in FIG. 2 is integrally composed of the ink jet recording head 100 and the liquid tank 1001 in which liquid is replenished whenever necessary, but there may also be adopted a configuration in which the liquid tank 1001 is interchangeably connected to the liquid discharge head 100.

A recording unit is an ink jet cartridge provided with an ink jet recording head.

<Method for Stabilizing Ink Discharge Property>

Recently, according to the market demand for high quality image printing at a higher speed, the nozzles of the thermal ink jet recording head have become smaller to eject as small as 20 pl or less, or even 10 pl or less per one ejection. Also, the drive frequency of the recording head has been increased to 5 kHz or higher, or even 10 kHz or higher. The ink of the present invention, to be applied to the above-described thermal ink jet printer, shows satisfactory start-up property and anti-clogging resistance, and also enables extremely stable ink discharge in recording. The upper limit of the drive frequency of the thermal ink jet printer, in which the ink of the present invention is applicable, is not particularly limited, but is about 15 kHz in practice.

EXAMPLES

In the following, the present invention is further explained with Examples and Comparative Examples, in which "part (s)" and "%" are by weight unless otherwise specified.

[Preparation of Ink 1]

(1) Preparation of Dispersion

Using benzyl methacrylate and methacrylic acid as the starting materials, block copolymer of AB type having an acid value of 250 and a number-average molecular weight of 3000 was prepared by a conventional method. The reaction mixture was then neutralized with an aqueous solution of potassium hydroxide and diluted with ion-exchanged water to obtain an aqueous, uniform solution of polymer at 50 weight %.

To 180 g of the above-mentioned polymer solution, 100 g of C.I. pigment blue 15:3 and 220 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa).

The obtained dispersion was centrifuged (12,000 rpm, 20 minutes) to eliminate not-dispersed substance including coarse particles. Thus-obtained dispersion 1 had a pigment concentration of 10 weight % and a dispersant concentration of 10 weight %.

(2) Preparation of Ink

To Dispersion 1, the following components were added to predetermined concentrations, and mixed well by agitation. Then the mixture was pressure-filtered through a microfilter (pore size: 2.5 μm, Fuji Film Co.) to obtain Ink 1 containing pigment at 2 weight % and dispersant at 2 weight %;

| | |
|---|---|
| Dispersion 1 | 20 parts |
| Glycerin | 5 parts |
| Ethylene urea | 10 parts |
| Polyoxyethylene cetylether (EO 30, HLB 19.5) | 0.5 parts |
| Ion-exchanged water | 64.5 parts |

[Preparation of Ink 2]

(1) Preparation of Dispersion

To 100 g of the above-mentioned polymer solution, 100 g of C.I. pigment red 122 and 300 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa).

The obtained dispersion was centrifuged (12,000 rpm, 20 minutes) to eliminate not-dispersed substance including coarse particles. Thus-obtained dispersion 2 contained the pigment at 10 weight % and the dispersant at 5 weight %.

(2) Preparation of Ink

To the magenta Dispersion 2, the following components were added to predetermined concentrations, and mixed well by agitation. Then the mixture was pressure-filtered through a microfilter (pore size: 2.5 μm, Fuji Film Co.) to obtain Ink 2 containing pigment at 4 weight % and dispersant at 2 weight %;

| | |
|---|---|
| Dispersion 2 | 40 parts |
| Glycerin | 7 parts |
| Ethylene urea | 3 parts |
| 2-pyrrolidone | 3 parts |
| 1,2,6-hexane-triol | 4 parts |
| Polyoxyethylene cetylether (EO 20, HLB 17) | 1 part |
| EO addition product of acetylene glycol (Trade name: Acetylenol EH, Kawaken Fine Chemical) | 0.5 parts |
| Ion-exchanged water | 41.5 parts |

[Preparation of Ink 3]

(1) Preparation of Dispersion

Using benzyl methacrylate and methacrylic acid as the starting materials, block copolymer of AB type having an acid value of 300 and a number-average molecular weight of 4000 was prepared by a conventional method. The reaction mixture was then neutralized with an aqueous solution of potassium hydroxide and diluted with ion-exchanged water to obtain an aqueous, uniform solution of polymer at 50 weight %.

To 110 g of the above-mentioned polymer solution, 100 g of C.I. pigment yellow 128 and 290 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa). The obtained dispersion was centrifuged (12,000 rpm, 20 minutes) to eliminate not-dispersed substance including coarse particles. Thus-obtained dispersion 3 had a pigment concentration of 10 weight % and a dispersant concentration of 6 weight %.

(2) Preparation of Ink

To Dispersion 3, the following components were added to predetermined concentrations, and mixed well by agitation. Then the mixture was pressure-filtered through a microfilter (pore size: 2.5 μm, Fuji Film Co.) to obtain Ink 3 containing the pigment at 5 weight % and the dispersant at 3 weight %;

| | |
|---|---|
| Dispersion 3 | 50 parts |
| Glycerin | 8 parts |
| Ethylene urea | 6 parts |
| Ethylene glycol | 5 parts |
| Polyoxyethylene oleylether (EO 10, HLB 14.5) | 1.2 parts |
| EO addition product of acetylene glycol (trade name: Surfinol 440, Air Products) | 0.5 parts |
| Ion-exchanged water | 29.3 parts |

[Preparation of Ink 4]

(1) Preparation of Dispersion

Using benzyl methacrylate, methacrylic acid and ethoxyethylene glycol as the starting materials, block copolymer of ABC type having an acid value of 350 and a number-average molecular weight of 2500 was prepared by a conventional method. The reaction mixture was then neutralized with an aqueous solution of potassium hydroxide and diluted with ion-exchanged water to obtain a uniform aqueous solution of polymer at 50 weight %.

To 60 g of the above-mentioned polymer solution, 100 g of carbon black and 340 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa). The obtained dispersion was centrifuged (12,000 rpm, 20 minutes) to eliminate not-dispersed substance including coarse particles. Thus-obtained dispersion 4 had a pigment concentration of 10 weight % and a dispersant concentration of 3.5 weight %.

(2) Preparation of Ink

To Dispersion 4, the following components were added to predetermined concentrations, and mixed well by agitation. Then the mixture was pressure-filtered through a microfilter (pore size: 2.5 μm, Fuji Film Co.) to obtain Ink 4 containing the pigment at 3 weight % and the dispersant at 1.05 weight %;

| | |
|---|---|
| Dispersion 4 | 40 parts |
| Glycerin | 3 parts |
| Ethylene urea | 6 parts |
| Triethylene glycol | 6 parts |
| 2-Pyrrolidone | 1.5 parts |
| Polyoxyethylene behenylether (EO 20, HLB 16.5) | 1.5 parts |
| EO addition product of acetylene glycol (Trade name: Acetylenol EH, Kawaken Fine Chemical) | 0.5 parts |
| Ion-exchanged water | 51.5 parts |

[Preparation of Ink 5]

(1) Preparation of Dispersion

Using benzyl methacrylate, methacrylic acid and ethoxyethylene glycol as the starting materials, block copolymer of ABC type having an acid value of 350 and a number-average molecular weight of 2500 was prepared by a conventional method. The reaction mixture was then neutralized with an aqueous solution of potassium hydroxide and diluted with ion-exchanged water to obtain a uniform aqueous solution of polymer at 50 weight %.

To 550 g of the above 50% polymer solution, 100 g of C.I. Pigment Blue 15:4 and 350 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa). The obtained dispersion was centrifuged (12,000 rpm, 20 minutes) to eliminate not-dispersed substance including coarse particles. Thus-obtained cyan dispersion 4 had a pigment concentration of 5 weight % and a dispersant concentration of 15 weight %.

(2) Preparation of Ink

To the above cyan dispersion 5, the following components were added to predetermined concentrations, and mixed well by agitation. Then the mixture was pressure-filtered through a microfilter (pore size: 2.5 μm, Fuji Film Co.) to obtain Ink 5 containing the pigment at 0.3 weight % and the dispersant at 3 weight %;

| Cyan dispersion | 6 parts |
| --- | --- |
| 50% Polymer solution 5 | 4.2 parts |
| Glycerin | 10 parts |
| Triethylene glycol | 5 parts |
| Ethylene urea | 10 parts |
| Polyoxyethylene behenylether (EO 15, HLB 14) | 0.5 parts |
| EO addition product of acetylene glycol (trade name: Acetylenol EH, Kawaken Fine Chemical) | 0.5 parts |
| Ion-exchanged water | 63.8 parts |

[Preparation of Ink 6]

(1) Preparation of Dispersion

To 250 g of the polymer solution used for preparing Ink 5, 100 g of C.I. Pigment Blue 15:4 and 150 g of ion-exchanged water were mixed and mechanically stirred for 0.5 hours. Then the mixture was processed by a micro fluidizer passing the mixture five times through an interaction chamber under a liquid pressure of about 10,000 psi (about 70 Mpa). The obtained dispersion was centrifuged (12,000 rpm, 20 minutes) to remove not-dispersed substances including coarse particles. Thus-obtained cyan dispersion had a pigment concentration of 10 weight % and a dispersant concentration of 14 weight %.

(2) Preparation of Ink

To the cyan dispersion 5, the following components were added to predetermined concentrations, and mixed well by agitation. Then the mixture was pressure-filtered through a microfilter (pore size: 2.5 μm, Fuji Film Co.) to obtain Ink 6 containing the pigment at 1.8 weight % and the dispersant at 2.52 weight %;

| Cyan dispersion | 18 parts |
| --- | --- |
| Glycerin | 10 parts |
| Triethylene glycol | 5 parts |
| Ethylene urea | 10 parts |
| Polyoxyethylene behenylether (EO 15, HLB 14) | 0.5 parts |
| EO addition product of acetylene glycol (Trade name: Acetylenol EH, Kawaken Fine Chemical) | 0.5 parts |
| Ion-exchanged water | 56 parts |

[Preparation of Ink 7]

(1) Preparation of Ink

The dispersion 1 employed in the preparation of Ink 1 and the following components were mixed to predetermined concentrations with sufficient agitation, and pressure-filtered through a microfilter (pore size: 2.5 μm, Fuji Film Co.) to obtain Ink 7 containing the pigment at 2% and the dispersant at 2%;

| Dispersion 1 | 20 parts |
| --- | --- |
| Glycerin | 15 parts |
| Polyoxyethylene cetylether (EO 30, HLB 19.5) | 0.5 parts |
| Ion-exchanged water | 64.5 parts |

[Preparation of Ink 8]

(1) Preparation of Ink

The dispersion 1 employed in the preparation of Ink 1 and the following components were mixed to predetermined concentrations with sufficient agitation, and pressure-filtered through a microfilter (pore size: 2.5 μm, Fuji Film Co.) to obtain Ink 8 containing the pigment at 2% and the dispersant at 2%;

| Dispersion 1 | 20 parts |
| --- | --- |
| Ethylene urea | 15 parts |
| Polyoxyethylene cetylether (EO 30, HLB 19.5) | 0.5 parts |
| Ion-exchanged water | 64.5 parts |

[Preparation of Ink 9]

(1) Preparation of Ink

The dispersion 1 employed in the preparation of Ink 1 and the following components were mixed to predetermined concentrations with sufficient agitation, and pressure-filtered through a microfilter (pore size: 2.5 μm, Fuji Film Co.) to obtain Ink 9 containing the pigment at 2% and the dispersant at 2%;

| Dispersion 1 | 20 parts |
| --- | --- |
| Glycerin | 5 parts |
| Ethylene urea | 10 parts |
| Ion-exchanged water | 65 parts |

[Preparation of Ink 10]

(1) Preparation of Ink

The dispersion 1 employed in the preparation of Ink 1 and the following components were mixed to predetermined concentrations with sufficient agitation, and pressure-filtered through a microfilter (pore size: 2.5 μm, Fuji Film Co.) to obtain Ink 10 containing the pigment at 2% and the dispersant at 2%;

| | | |
|---|---|---|
| Dispersion 1 | 20 parts | |
| Glycerin | 5 parts | |
| Ethylene urea | 10 parts | |
| Polyoxyethylene cetylether (EO 7, HLB 11.5) | 0.5 parts | |
| Ion-exchanged water | 64.5 parts | |

Examples 1–6 and Comparative Examples 1–4

Each of the inks obtained as described above (inks 1–6 for Examples 1–6, and inks 7–10 for Comparative Examples 1–4) was charged in an ink tank of a color ink jet recording apparatus to carry out the following tests. The ink jet recording apparatus was a large color bubble-jet printer (BJ-W9000; Canon Inc.) having plural on-demand recording heads that discharge ink using thermal energy applied to the ink according to the recording signals. With the thermal heads of this apparatus, the droplet size per discharge operation was about 8.5 pl.

[Evaluation Items]

(1) Start-up Properties

The printer was left standing in the power-off state in an environment of 25° C. and 10% humidity, and then in an environment of normal temperature and normal humidity for two hours. After that, the power was on, and the initial printing condition was evaluated according to the following criteria. The results of evaluation are shown in Table 1:

A: no difference from the printing condition prior to the standing;
B: somewhat different from the printing condition prior to the standing;
C: evidently different from the print state prior to the standing.

(2) Solidification Resistance

The heads were detached from the main body of the printer, and left standing for 1 week in an environment of 35° C. and 10% humidity. Then the heads were mounted on the printer to evaluate whether an ordinary recovery operation can restore the printing operation. The evaluation criteria are as follows:

A: printing is recovered with a single recovery operation in the main body;
B: printing is recovered with several recovery operations in the main body;
C: printing is not recovered by the recovery operations in the main body.

(3) Durability in Printing

Using the above printer, $3 \times 10^8$ pulses of an ink were discharged continuously from 20 nozzles at a drive frequency of 7.5 kHz, designating these nozzles as durability test nozzles. Then solid patterns were printed using the durability test nozzles and other nozzles not subjected to such continuous discharge (control nozzles), and the difference in density of the obtained solid patterns was visually evaluated. If the dispersion state of the coloring material in the ink was destroyed in the vicinity of the heater during the high frequency drive of 7.5 kHz, a solidified substance would have been deposited on the heater face of the durability test nozzles, resulting in a difference in the density between the solid pattern formed with such durability test nozzles and one formed with the control nozzles.

A: no density difference between the control nozzles and the durability test nozzles;
B: some density difference between the control nozzles and the durability test nozzles;
C: evident density difference between the control nozzles and the durability test nozzles.

(4) Ink Storage Stability

In a tightly stoppered glass bottle, 100 g of ink was stored for 2 months in a thermostat of 0° C. and was evaluated for any change in viscosity and particle size in comparison with the initial conditions before storage:

A: differences in viscosity and particle size are less than 5% before and after the storage;
B: differences in viscosity and particle size are less than 10% before and after the storage;
C: differences in viscosity and particle size are 10% or more before and after the storage.

The results of evaluation of the items (1) to (4) are summarized in Table 1.

TABLE 1

| | (1) Start-up property | (2) Solidification resistance | (3) Printing durability | (4) Ink storability |
|---|---|---|---|---|
| Example 1 Ink 1 | A | A | A | A |
| Ex. 2 Ink 2 | A | A | A | A |
| Ex. 3 Ink 3 | A | A | A | A |
| Ex. 4 Ink 4 | A | A | A | A |
| Ex. 5 Ink 5 | A | A | A | A |
| Ex. 6 Ink 6 | A | A | A | A |
| Comparative Example 1 Ink 7 | C | B | B | B |
| Comp. Ex. 2 Ink 8 | B | C | C | C |
| Comp. Ex. 3 Ink 9 | A | A | C | A |
| Comp. Ex. 4 Ink 10 | A | A | C | A |

The results of evaluations (1), (2) and (4) show that the inks 1 to 6 of the present invention have satisfactory ink-jet properties and the results of evaluation (3) show that they maintain discharge stability even in a high frequency drive. Thus the ink of the present invention meets the requirements of both satisfactory ink-jet properties and applicability for high-speed printing.

Advantages of the Present Invention

According to the present invention, as explained in the foregoing, when a pigment ink jet recording ink that comprises at least water, a pigment, a resin dispersant, glycerin, ethylene urea, and polyoxyethylene alkyl ether having HLB of 13 or more is used for thermal ink-jet printing, there are obtained satisfactory start-up property and also excellent resistance against solidification of the coloring material at the front end of the nozzle, stable ink discharge without nozzle clogging, and excellent printing durability even in high frequency drive. The storability of the ink is also excellent.

What is claimed is:

1. An ink for ink jet recording, comprising water, a water-insoluble coloring material, a resinous dispersant for dispersing said water-insoluble coloring material into water, glycerin, ethylene urea, and polyoxyethylene alkyl ether having HLB of 13 or more, wherein:

glycerin is contained in an amount of 3 to 15 weight % based on the total weight of the ink, ethylene urea is contained in an amount of 3 to 15 weight % based on the total weight of the ink, and the content ratio of glycerin to ethylene urea is within a range of 7:3 to 1:2.

2. The ink according to claim 1, further comprising an ethylene oxide adduct of acetylene glycol.

3. The ink according to claim 2, further comprising at least one selected from the group consisting of 2-pyrrolidone, ethylene glycol, glycol of 3 to 6 carbon atoms and triol of 4 to 6 carbon atoms.

4. The ink according to claim 1, further comprising at least one selected from the group consisting of 2-pyrrolidone, ethylene glycol, glycol of 3 to 6 carbon atoms and triol of 4 to 6 carbon atoms.

5. The ink according to claim 1, wherein said resinous dispersant comprises a block copolymer.

6. The ink according to claim 1, being for thermal ink jet recording.

7. An ink jet recording method comprising a step of discharging the ink according to claim 6 with an ink jet head, wherein said ink jet head is a thermal ink jet head.

8. The ink jet recording method according to claim 7, further comprising a step of driving said ink jet head with a frequency of not lower than 5 kHz.

9. The ink jet recording method according to claim 8, further comprising a step of driving said ink jet head with a frequency of not lower than 10 kHz.

10. The ink jet recording method according to claim 8 or 9, wherein the frequency for driving said ink jet head is not more than 15 kHz.

11. A method for stabilizing ink discharge from an ink jet recording head when the ink jet recording head is driven at a frequency of not less than 5 kHz, the ink jet recording head's ink discharge amount per discharge operation being not more than 20 pl, comprising the step of utilizing an ink of claim 6 for discharging with the ink jet recording head.

12. An ink cartridge comprising an ink container containing an ink according to any one of claims 1 to 4, 5, 6, or 3.

13. The ink cartridge according to claim 12, wherein polyoxyethylene alkyl ether is contained in the ink in an amount of 0.1 to 3 weight % based on the total weight of the ink.

14. A recording unit comprising an ink container containing an ink according to any one of claims 1 to 4, 5, 6 or 3, and an ink jet head for discharging said ink.

15. The recording unit according to claim 14, wherein said ink is an ink for thermal ink jet recording, and said ink jet head is of a type for discharging said ink from an orifice by providing said ink with thermal energy.

16. The recording unit according to claim 14, wherein polyoxyethylene alkyl ether is contained in the ink in an amount of 0.1 to 3 weight % based on the total weight of the ink.

17. An ink jet recording method comprising a step of discharging ink according to any one of claims 1 to 4, 5, 6 or 3, with an ink jet head.

18. The ink jet recording method according to claim 17, wherein the ink discharge amount per discharge operation of said ink jet head is not more than 20 pl.

19. The ink jet recording method according to claim 17, wherein polyoxyethylene alkyl ether is contained in the ink in an amount of 0.1 to 3 weight % based on the total weight of the ink.

20. An ink jet recording apparatus comprising an ink container containing the ink according to any one of claims 1 to 4, 5, 6 or 3, and an ink jet recording head for discharging said ink.

21. The ink jet recording apparatus according to claim 20, wherein said ink jet recording head is a thermal ink jet recording head.

22. The ink jet recording apparatus according to claim 21, further comprising means for driving said thermal ink jet recording head with a drive frequency not lower than 5 kHz.

23. The ink jet recording apparatus according to claim 20, wherein the ink discharge amount per discharge operation of said thermal ink jet recording head is not more than 20 pl.

24. The ink jet recording apparatus according to claim 20, wherein polyoxyethylene alkyl ether is contained in the ink in an amount of 0.1 to 3 weight % based on the total weight of the ink.

25. The ink according to claim 1, wherein polyoxyethylene alkyl ether is contained in an amount of 0.1 to 3 weight % based on the total weight of the ink.

* * * * *

UNITED STATES PATENT AND TRADEMARK OFFICE
CERTIFICATE OF CORRECTION

PATENT NO. : 6,874,881 B2  
APPLICATION NO. : 10/214912  
DATED : April 5, 2005  
INVENTOR(S) : Mariko Suzuki et al.

Page 1 of 1

It is certified that error appears in the above-identified patent and that said Letters Patent is hereby corrected as shown below:

COLUMN 3  
Line 42, "B;" should read --2B;--.

COLUMN 17  
Line 36, "claims 1 to 4, 5, 6 or 3." should read --claims 1 to 6.--.  
Line 42, "claims 1 to 4, 5, 6 or 3," should read --claims 1 to 6,--.

COLUMN 18  
Line 11, "claims 1 to 4, 5, 6" should read --claims 1 to 6,--.  
Line 12, "or 3," should be deleted.  
Line 23, "claims 1 to 4, 5, 6 or 3," should read --claims 1 to 6,--.

Signed and Sealed this

Fifth Day of September, 2006

JON W. DUDAS  
*Director of the United States Patent and Trademark Office*